(12) United States Patent
Takei et al.

(10) Patent No.: US 10,985,359 B2
(45) Date of Patent: Apr. 20, 2021

(54) ELECTRODE LEAD WIRE MEMBER AND BATTERY

(71) Applicant: FUJIMORI KOGYO CO., LTD., Tokyo (JP)

(72) Inventors: Kunihiro Takei, Tokyo (JP); Hirokazu Iizuka, Tokyo (JP); Shunsuke Takeyama, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 31 days.

(21) Appl. No.: 16/266,441

(22) Filed: Feb. 4, 2019

(65) Prior Publication Data

US 2019/0245189 A1    Aug. 8, 2019

(30) Foreign Application Priority Data

Feb. 5, 2018 (JP) .............................. JP2018-018521

(51) Int. Cl.
*H01M 2/32* (2006.01)
*H01M 2/30* (2006.01)

(52) U.S. Cl.
CPC ............... *H01M 2/32* (2013.01); *H01M 2/30* (2013.01)

(58) Field of Classification Search
CPC ............. H01M 2/06; H01M 2/30; H01M 2/32
See application file for complete search history.

(56) References Cited

U.S. PATENT DOCUMENTS

| 7,358,007 B1 | 4/2008 | Sawada et al. |
| 2008/0182097 A1 | 7/2008 | Mochizuki et al. |
| 2009/0110945 A1* | 4/2009 | Yasui .................. B32B 7/12 428/523 |
| 2013/0216892 A1 | 8/2013 | Matsuura et al. |

FOREIGN PATENT DOCUMENTS

| JP | 2017-120790 A | 7/2017 |
| KR | 10-0444619 B1 | 8/2004 |
| KR | 10-2013-0129936 A | 11/2013 |
| KR | 10-1376724 B1 | 3/2014 |
| KR | 10-1404875 B1 | 6/2014 |
| WO | 2001/017043 A1 | 3/2001 |
| WO | WO-2014091544 A1 * | 6/2014 ............. H01G 11/80 |

OTHER PUBLICATIONS

Machine Translation WO2014091544(A1) (Year: 2014).*
Machine Translation JP2017120790(A) (Year: 2017).*
Office Action for Korean Patent Application No. 10-2019-0011743 dated Mar. 30, 2020 and English translation thereof; 13 pgs.
Notice of Allowance for Korean Patent Application No. 10-2019-0011743 dated Oct. 17, 2020 and English translation thereof; 3 pgs.

* cited by examiner

*Primary Examiner* — Victoria H Lynch
(74) *Attorney, Agent, or Firm* — Hauptman Ham, LLP

(57) ABSTRACT

Provided are an electrode lead wire member including a sealing film having high adhesive strength and resistance to an electrolytic solution, and a battery including the electrode lead wire member. Provided is an electrode lead wire member including: a derivation portion extending in one direction; a surface-treated layer formed, at the derivation portion, on a surface of the derivation portion; and a sealing film provided in contact with the surface-treated layer, in which the sealing film has an adhesive resin layer in contact with the surface-treated layer, and the adhesive resin layer contains imine-modified polyolefin or modified polyolefin having a carbodiimide group.

6 Claims, 4 Drawing Sheets

ELECTRODE LEAD WIRE MEMBER AND BATTERY

CROSS-REFERENCE TO RELATED APPLICATIONS

This application claims the priority from Japanese Patent Application No. 2018-018521 (filing date: Feb. 5, 2018). The entire teachings of the above application are incorporated herein by reference.

BACKGROUND OF THE INVENTION

(1) Field of the Invention

The present invention relates to an electrode lead wire member and a battery.

(2) Description of Related Art

In recent years, a secondary battery, a capacitor, and the like, packaged in a container including a film, have been adopted as a power source of electronic equipment such as a laptop computer and a cellular phone, a battery for an automobile such as a hybrid vehicle, a fuel battery automobile, and an electric automobile.

The above-mentioned automobiles are small in load on the environment as compared with a gasoline automobile, and each automobile manufacturer is putting effort into development of the above-mentioned automobiles. In those automobiles, since electric power that is charged and discharged is large, a battery has also been enlarged.

Conventionally, these secondary batteries and capacitors have been configured by enclosing power generation elements into a flat container. In this container, an electrode lead wire member for charge and discharge is sealed with one end thereof protruding outward. Upon sealing, a tape-like electrode lead wire member is held between film substrates of the container, and the film substrates are heat-sealed.

Examples of these film substrates include a film-like laminate in which substrate layer/adhesive layer/metal layer/sealant layer are laminated sequentially. For example, Japanese Unexamined Patent Application, First Publication No. 2017-120790 describes an adhesive film for sealing an electric storage device metal terminal part comprising a heat-resistant substrate layer and an insulating layer. Japanese Unexamined Patent Application, First Publication No. 2017-120790 describes that the insulating layer is formed using a composition for an insulating layer comprising acid-modified polyolefin and a curing agent.

SUMMARY OF THE INVENTION

A sealing film used in a sealing material for a secondary battery or a capacitor is required to be improved in adhesive strength for realizing high sealing strength, and additionally is required to have resistance to an electrolytic solution supposing that the film comes in contact with the electrolytic solution.

The present invention has been made in view of the above-mentioned circumstances, and an object thereof is to provide an electrode lead wire member comprising a sealing film having high adhesive strength and resistance to an electrolytic solution, and a battery comprising the electrode lead wire member.

That is, the present invention has adopted the following constituent features.

[1] An electrode lead wire member comprising: a derivation portion extending in one direction; a surface-treated layer formed, at the derivation portion, on a surface of the derivation portion; and a sealing film provided in contact with the surface-treated layer, wherein the sealing film has an adhesive resin layer in contact with the surface-treated layer, and the adhesive resin layer contains imine-modified polyolefin or modified polyolefin having a carbodiimide group.

[2] The electrode lead wire member according to [1], wherein the surface-treated layer has an acidic group.

[3] The electrode lead wire member according to [1] or [2], wherein the sealing film only includes the adhesive resin layer.

[4] The electrode lead wire member according to [1] or [2], wherein in the sealing film, the adhesive resin layer, a substrate layer, and a second adhesive resin layer are laminated in that order.

[5] The electrode lead wire member according to [4], wherein a resin constituting the substrate layer is one or more selected from the group consisting of a fluorine resin, polyether ether ketone, a polyphenylene sulfide resin, polyphenylene ether, a syndiotactic polystyrene resin, polyethylene naphthalate, polyethylene terephthalate, a polyimide resin, a phenol resin, an epoxy resin, an acrylic resin, polyketone, a cyclic olefin resin, polymethylpentene, polypropylene, and polyethylene.

[6] The electrode lead wire member according to any one of [1] to [5], comprising one pair of the sealing films holding the derivation portion, wherein in the one pair of the sealing films, the adhesive resin layers face and come in contact with each other, and simultaneously come in contact with a whole circumference in a circumferential direction of the derivation portion to cover the derivation portion.

[7] A battery comprising the electrode lead wire member with the sealing film according to any one of [1] to [6].

According to the present invention, there can be provided an electrode lead wire member comprising a sealing film having high adhesive strength and resistance to an electrolytic solution, and a battery comprising the electrode lead wire member.

DETAILED DESCRIPTION OF PREFERRED EMBODIMENTS

Hereinafter, a preferred embodiment of the present invention will be described.

Note that the following embodiment is one example of the present invention, and the present invention is not limited to this.

<Electrode Lead Wire Member and Battery>

The electrode lead wire member of the present invention will be described while a configuration of a battery of the present embodiment is described.

First, the electrode lead wire member of the present embodiment comprises a derivation portion extending in one direction, a surface-treated layer formed, at the derivation portion, on a surface of the derivation portion, and a sealing film provided in contact with the surface-treated layer.

It is preferable that the surface-treated layer has an acidic group. The sealing film has an adhesive resin layer in contact with the surface-treated layer. The adhesive resin layer contains imine-modified polyolefin or modified polyolefin having a carbodiimide group.

Figure 4:
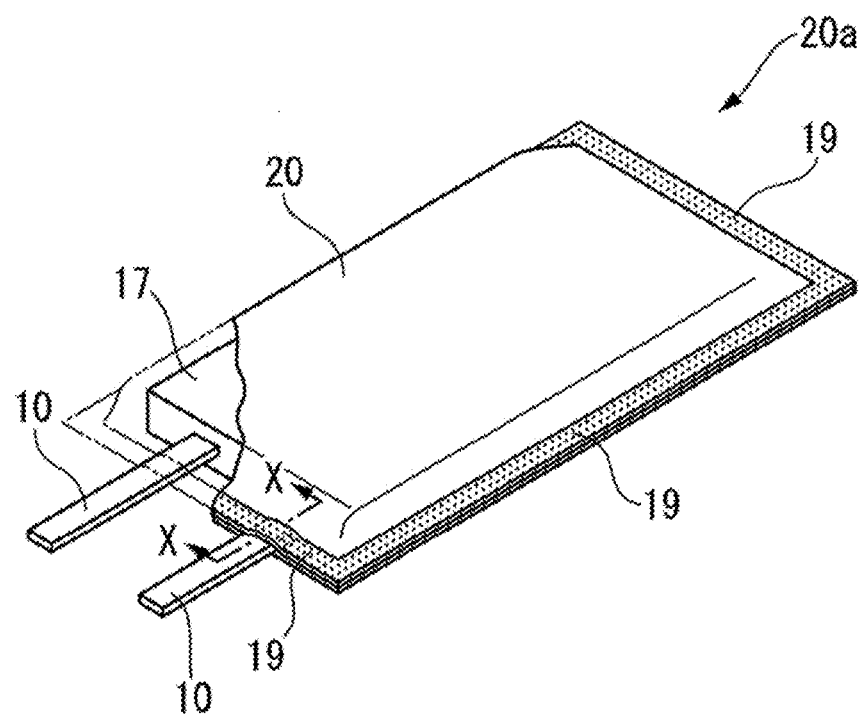
FIG. 4 is a perspective view showing one example of a battery.

FIG. 4 shows one example of a battery 20a of the present embodiment. In the battery 20a, an electrode lead wire member 10 of the present invention and a lithium ion battery 17 are included in a battery exterior container that is prepared by folding a laminate 20 for a battery outer package.

Furthermore, each of three side edges 19 of the battery 20a is formed by heat-sealing the laminate 20 for a battery outer package to make the laminate 20 into a bag. The electrode lead wire member 10 is pulled out from the battery 20a, as shown in FIG. 4.

Figure 1:
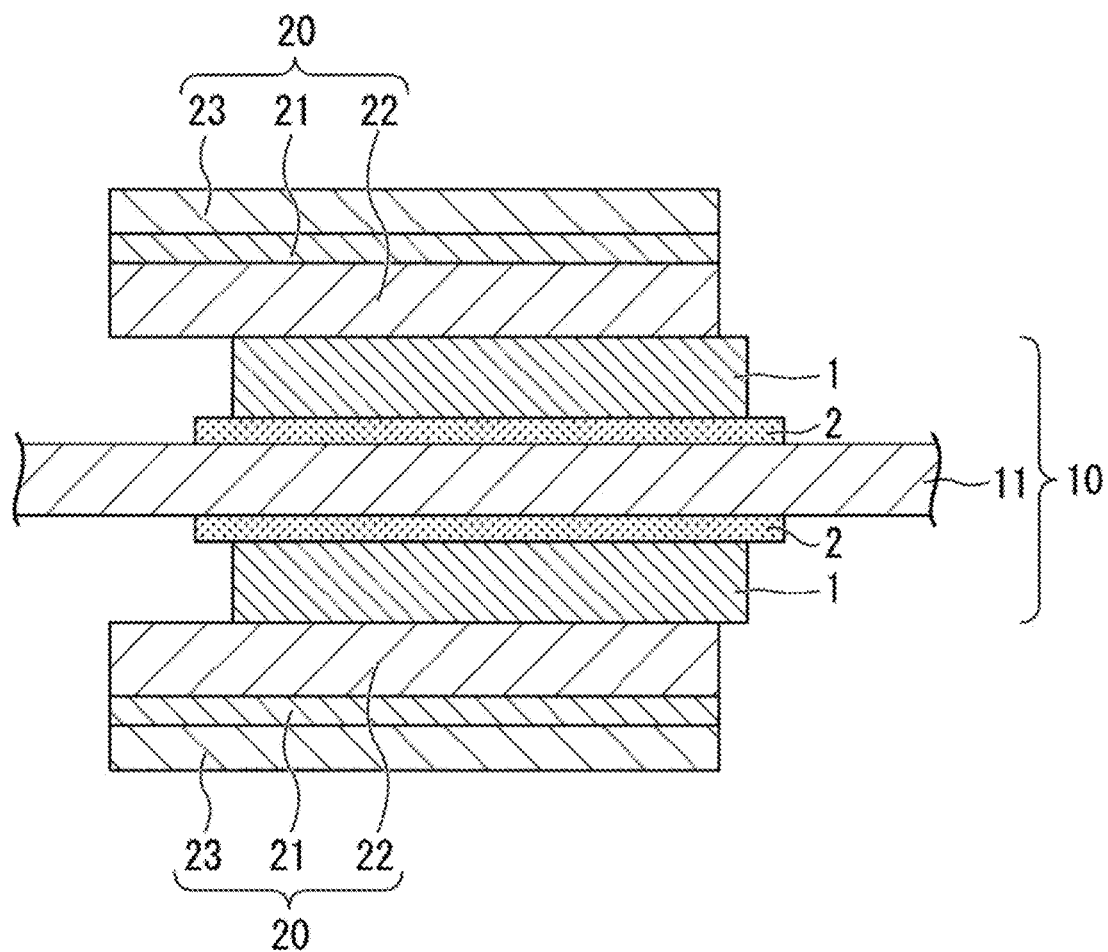
FIG. 1 is a cross-sectional view showing a state where an electrode lead wire member of the present invention and a laminate for a battery outer package are joined.

FIG. 1 shows a cross-sectional view along X-X line of FIG. 4.

The electrode lead wire member 10 comprises a derivation portion 11 having a surface-treated layer 2 on each of both surfaces, and a sealing film 1 that is laminated so as to come in contact with a surface of the surface-treated layer 2. In an aspect shown in FIG. 1, the sealing film 1 is a monolayer film only including an adhesive resin layer.

Furthermore, the electrode lead wire member 10 is fused with the laminate 20 for a battery outer package via the sealing film 1 included in the electrode lead wire member 10.

The laminate 20 for a battery outer package comprises a film substrate layer 23, a metal foil layer 21, and a sealant layer 22.

Figure 2:
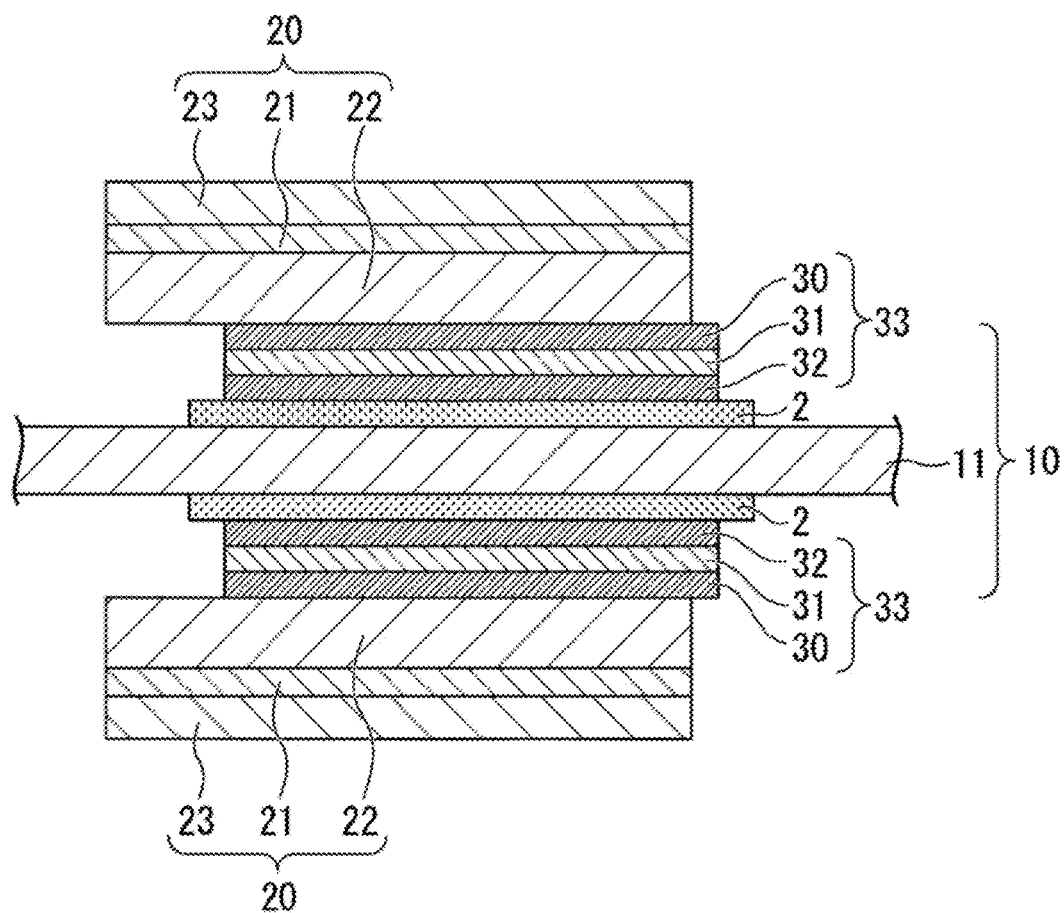
FIG. 2 is a cross-sectional view showing a state where the electrode lead wire member of the present invention and the laminate for a battery outer package are joined.

FIG. 2 shows a cross-sectional view along a longitudinal direction of the electrode lead wire member 10 in another aspect of the present invention. In this aspect, a sealing film 33 may be a laminate in which an adhesive resin layer 30, a substrate layer 31, and a second adhesive resin layer 32 are laminated in that order.

Figure 3:
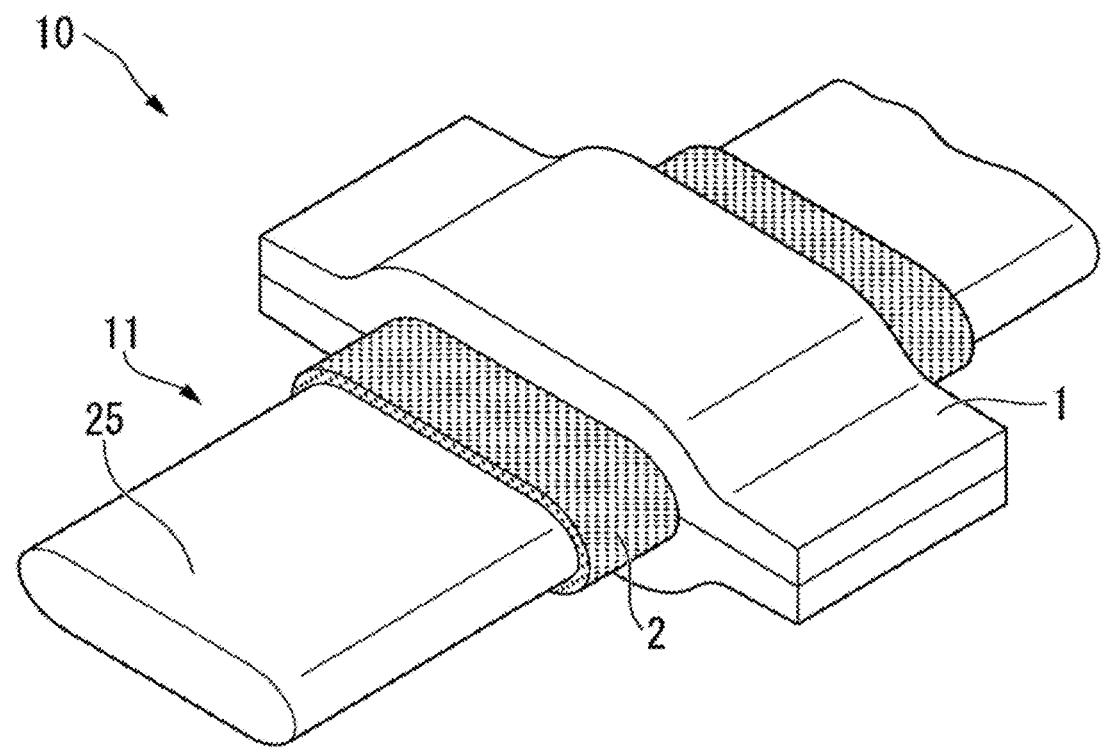
FIG. 3 is a perspective view showing one example of the electrode lead wire member of the present invention.

FIG. 3 is a perspective view showing one example of the electrode lead wire member 10 of the present embodiment.

The electrode lead wire member 10 has one pair of the sealing films 1 holding the derivation portion 11.

In the one pair of the sealing films 1, the adhesive resin layers face and come in contact with each other, and simultaneously come in contact with a whole circumference in a circumferential direction of the derivation portion 11 to cover the derivation portion.

In the electrode lead wire member shown in FIG. 3, the surface of the electrode lead wire member has been subjected to surface treatment shown with reference numeral 2 in a belt manner.

Figure 5A:
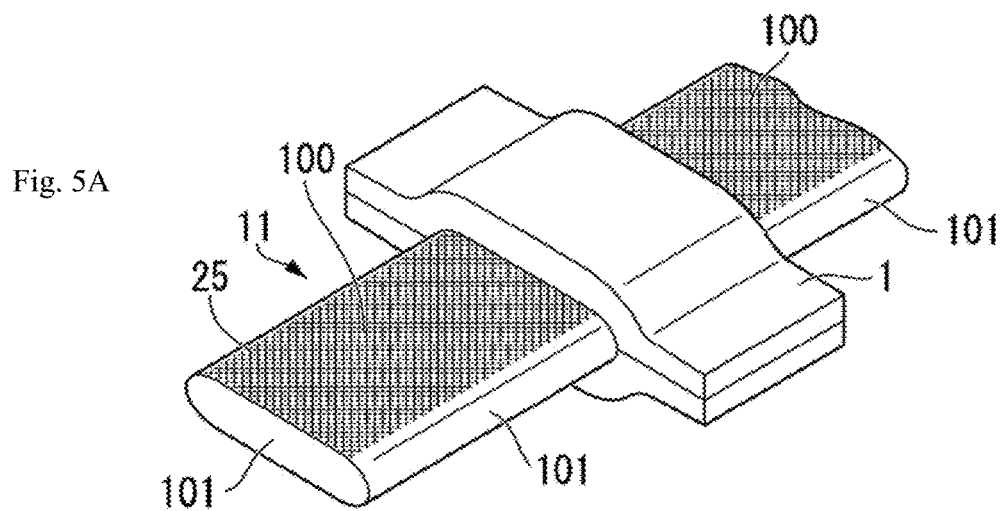
FIGS. 5A to 5C are views for illustrating a surface-treated portion of the electrode lead wire member.

As the surface treatment of the electrode lead wire member, an upper surface of the lead wire member and a bottom surface (not shown) on an opposite surface of the upper surface can also be treated as shown in FIG. 5A. Reference numeral 100 in FIG. 5A means a surface that has been subjected to surface treatment. Reference numeral 101 in FIG. 5A means a surface that has not been subjected to surface treatment.

In the case of the configuration as in FIG. 5A, the member can be produced by cutting a metal foil having a great area in which an upper surface and a rear surface thereof have been subjected to surface treatment. For that reason, this is preferable from the viewpoint of improving the production efficiency and the mass production suitability.

Figure 5B:
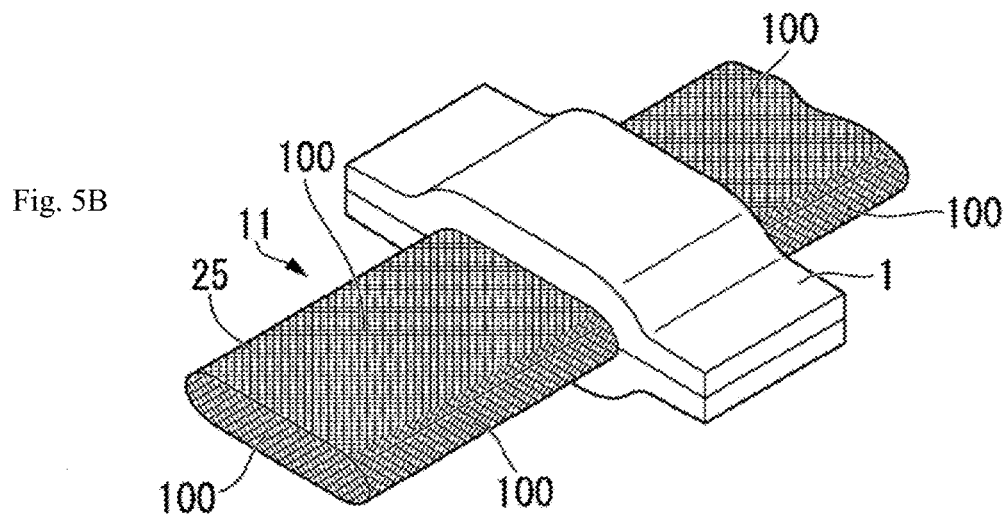

A whole surface of the lead wire member can also be treated, as shown in FIG. 5B. Reference numeral 100 in FIG. 5B means a surface that has been subjected to surface treatment.

In the case of the configuration as in FIG. 5B, since a whole surface of a metal foil that has been cut in a whole surface can be subjected to surface treatment at once, uniform surface treatment can be performed.

Figure 5C:
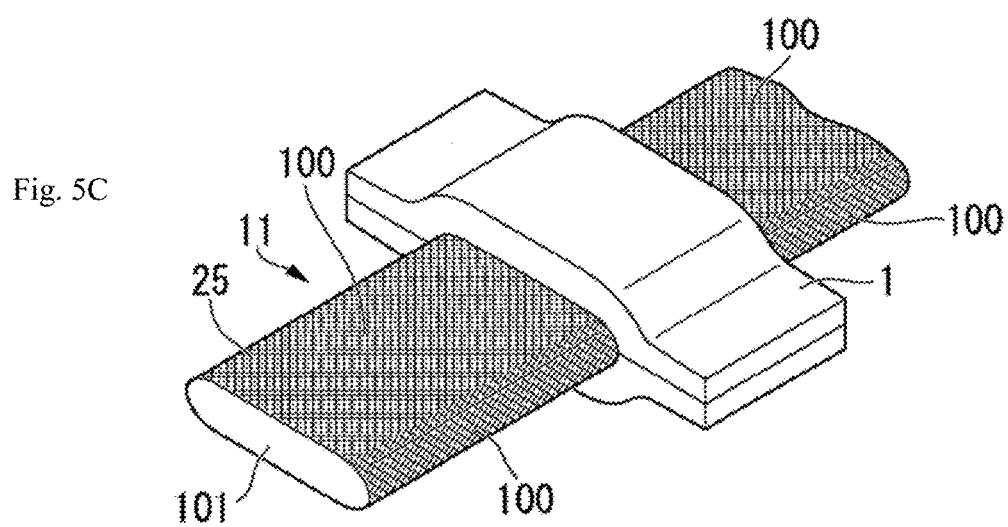

As shown in FIG. 5C, treatment may be performed in a range shown with reference numeral 100 in the circumferential direction of the electrode lead wire member, and an end portion may be a surface that has not been subjected to surface treatment as shown with reference numeral 101.

In the case of the configuration as in FIG. 5C, the member can be produced by cutting a long bar-like metal foil having a surface that has been subjected to surface treatment. For that reason, this is preferable from the viewpoint of improving the mass production suitability.

The electrode lead wire member of the present embodiment comprises a surface-treated layer 2 in which an acidic group is exposed on a surface of the derivation portion 11. The acidic group included in the surface-treated layer 2 and imine-modified polyolefin or modified polyolefin having a carbodiimide group in the adhesive resin layer are reacted to bond firmly. Accordingly, the adhesive layer firmly adheres to an adherend, and additionally, the strength of the electrode lead wire member with a sealing film can be secured. As a result, the electrode lead wire member of the present embodiment has resistance to an electrolytic solution, in addition to high adhesive force.

<<Derivation Portion>>

As a material of the derivation portion 11, for example, known metal such as aluminum, copper, nickel, iron, gold, platinum, and various alloys can be used. Among them, aluminum and copper are preferably used due to excellent electrical conductivity and an advantage in cost. However, aluminum and copper may not be sufficient in resistance to hydrogen fluoride (hydrofluoric acid) that may have the risk of being generated in an electrolytic solution in a battery pack.

When the derivation portion 11 is plated with nickel, electroplating may be performed using a Watts bath containing nickel sulfate, nickel chloride, boric acid, and the like as main components, but when a nickel sulfamate plating bath containing nickel sulfamate and boric acid as main components is used, a plating film to be formed has low stress and is excellent in flexibility, so that this is preferable. When excellent in flexibility, the plating film has few defects such as cracking. It is particularly preferable that the derivation portion is an aluminum and nickel-plated copper plate.

<<Surface-Treated Layer>>

The surface-treated layer 2 is formed on the surface of the derivation portion 11. It is preferable that an acidic group is exposed on a surface of the surface-treated layer 2.

Examples of a method of exposing an acidic group on the surface-treated layer 2 include a method of performing chromate treatment, a method of performing chitosan treatment, and a method of performing treatment with a carboxylic acid-modified water-soluble resin. These treatments makes it possible to expose an acidic group such as a carboxy group, a carbonyl group, a phenolic hydroxy group, sulfo group or a phosphoric acid on the surface of the surface-treated layer 2.

Chromate Treatment

The surface-treated layer 2 on which an acidic group is exposed can be formed by subjecting the surface of the derivation portion 11 to chromate treatment or phosphoric chromate treatment. A specific example of a treatment liquid used in the phosphoric chromate treatment includes an aqueous solution comprising a phenol resin, chromium (III) fluoride, and phosphoric acid. For example, by coating the aqueous solution on the surface of the derivation portion 11 by an immersion method, a shower method, a roll coating method or the like, and drying the aqueous solution, a surface-treated layer on which an acidic group derived from particularly a phenol resin or phosphoric acid is exposed can be formed.

Chitosan Treatment

Alternatively, a surface-treated layer 2 including a surface treating agent containing at least one of chitosans selected from chitosan and a chitosan derivative may be provided on the surface of the derivation portion 11.

When this surface treating agent further contains an organic compound having at least one carboxy group in the molecule, the organic compound promotes crosslinking of the surface treating agent containing chitosans, which is formed on the surface of the electrode lead wire member, to improve the strength of a film and corrosion resistance to an electrolytic solution, so that this is preferable. Examples of such an organic compound include acetic acid, oxalic acid, malonic acid, malic acid, tartaric acid, mellitic acid, adipic acid, succinic acid, maleic acid, phthalic acid, sebacic acid, citric acid, butanetricarboxylic acid, propanetricarboxylic acid, pyromellitic acid, trimellitic acid, ethylenediaminetetracarboxylic acid, 1,2,3,4-butanetetracarboxylic acid, diethylenetriaminepentaacetic acid, tannic acid, phytic acid, polyacrylic acid, polymethacrylic acid, and the like. Among them, from the viewpoint of crosslinking properties, a tribasic acid, a tetrabasic acid or a pentabasic acid is more preferable.

When this surface treating agent further contains a metal compound containing at least one metal selected from Ti, Zr, Hf, Mo, W, Se, Ce, Fe, Cu, Zn, V, and trivalent Cr, corrosion resistance to an electrolytic solution is improved, so that this is preferable. These metal compounds are used in the form of metal oxide, hydroxide, a complex compound, an organic acid salt, an inorganic acid salt or the like.

Upon formation of the surface-treated layer, chitosans and, if necessary, the above-mentioned metal compound and other additives are dissolved in water, and the surface treating agent that has been prepared into an aqueous solution is coated on the surface of the derivation portion 11, and the surface treating agent is dried.

By thermocompression-bonding the sealing film 1 on the surface of this surface-treated layer, firm adhesion can be made.

Chitosan that is a main component of this surface treating agent is obtained by deacetylating chitin obtained from shells of crabs, shrimps, and the like. Chitin is ß-poly-N-acetyl-D-glucosamine. Chitosan is a polysaccharide containing an amino group containing 2-amino-2-deoxy-D-glucose as a constituent unit. Chitosan forms a salt with various acids, and when it is dissolved in water, the solution exhibits cationic property.

Chitosan has high reactivity. The surface treating agent containing chitosans as a main component can adhere to any surface of the derivation portion 11 that is hydrophilic and the sealing film 1 that is hydrophobic.

The chitosans contained in the surface treating agent preferably has a weight average molecular weight in a range of 1,000 to 2,000,000, and more preferably in a range of 10,000 to 1,000,000. When the molecular weight is smaller than this range, the strength of the film of the surface-treated layer may not be sufficient. When the molecular weight is larger than this range, the viscosity of an aqueous solution is too high, and this solution may cause difficulty in handling.

As the derivative of chitosan, chitosan, a pyrrolidone carboxylic acid salt of chitosan, hydroxypropylchitosan, glycerylated chitosan, cationized chitosan, a lactic acid salt of chitosan, an adipic acid salt of chitosan, and the like are preferable. The derivative of chitosan may only include 2-amino-2-deoxy-D-glucose. Alternatively, the derivative may be a copolymer of these and other glucose. Furthermore, other substituent may be introduced into part of a functional group of glucosamine.

Method of Performing Treatment with Carboxylic Acid-Modified Water-Soluble Resin Examples of a method of performing treatment with a carboxylic acid-modified water-soluble resin include a method of forming the surface-treated layer by coating a solution containing a polyvinyl alcohol-based resin and a fluorine compound, followed by drying.

The polyvinyl alcohol-based resin is at least one water-soluble resin selected from a polyvinyl alcohol resin and a modified polyvinyl alcohol resin. Usually, the polyvinyl alcohol-based resin has a saponification degree of preferably 90 to 100 mol %, and more preferably 95 mol % or more.

Examples of the polyvinyl alcohol-based resin and a derivative thereof usable in the present invention include an alkyl ether-modified polyvinyl alcohol resin, a carbonyl-modified polyvinyl alcohol resin, an acetoacetyl-modified polyvinyl alcohol resin, an acetamide-modified polyvinyl alcohol resin, an acrylonitrile-modified polyvinyl alcohol resin, a carboxyl-modified polyvinyl alcohol resin, a silicone-modified polyvinyl alcohol resin, an ethylene-modified polyvinyl alcohol resin, and the like. Among them, an alkyl ether-modified polyvinyl alcohol resin, a carbonyl-modified polyvinyl alcohol resin, a carboxyl-modified polyvinyl alcohol resin, and an acetoacetyl-modified polyvinyl alcohol resin are preferable.

Examples of a generally available commercial product of the polyvinyl alcohol-based resin include products manufactured by Nippon Synthetic Chemical Industry Co., Ltd., JAPAN VAM & POVAL CO., LTD., NIPPON CARBIDE INDUSTRIES CO., INC., and the like. As the polyvinyl alcohol-based resin, one kind or a mixture of two or more kinds may be used.

<<Sealing Film>>

In the present embodiment, the sealing film 1 is provided in contact with the surface-treated layer 2.

Substrate Layer

A resin constituting the substrate layer is not particularly limited, as long as it is a resin having sufficient heat resistance so that it can be heat-sealed. In the present embodiment, examples thereof include one or more selected from the group consisting of a fluorine resin, polyether ether ketone, a polyphenylene sulfide resin (SPS), polyphenylene ether, a syndiotactic polystyrene resin, polyethylene naphthalate, polyethylene terephthalate (PET), a polyimide resin, a phenol resin, an epoxy resin, an acrylic resin, polyketone, a cyclic olefin resin, polymethylpentene, polypropylene, and polyethylene.

In the present embodiment, among the above-mentioned resins, a fluorine resin, PET or SPS is preferable.

Adhesive Agent Composition

In the present embodiment, the adhesive resin layer comprises an adhesive agent composition. The adhesive agent composition used in the present embodiment contains imine-modified polyolefin or modified polyolefin having a carbodiimide group.

The adhesive agent composition used in the present embodiment contains imine-modified polyolefin or modified polyolefin having a carbodiimide group as an essential component, and may contain optional unmodified polyolefin and an optional olefin-based elastomer.

Imine-Modified Polyolefin

It is preferable that in the present embodiment, imine-modified polyolefin is obtained by graft-treating a polyimine compound having a plurality of imino groups in adhesive polyolefin in the presence of a radical generator. In the present embodiment, imine-modified polypropylene obtained by graft-treating polypropyleneimine is preferable.

In the present embodiment, a melt flow rate measured under conditions of a temperature of 190° C. or 230° C. and a load of 2.16 kg in accordance with ASTM D1238 is preferably 2 g/10 min or more and 25 g/10 min or less, more preferably 2.5 g/10 min or more and 20 g/10 min or less, and further preferably 2.8 g/10 min or more and 18 g/10 min or less.

Examples of the adhesive polyolefin include polyethylene, polypropylene, poly-1-butene, polyisobutylene, a copolymer of propylene and ethylene, a copolymer of propylene and an olefin-based monomer, and the like.

Examples of the above-mentioned olefin-based monomer in the case of copolymerization include 1-butene, isobutylene, 1-hexene, and the like.

The copolymer may be a block copolymer or a random copolymer.

Inter alia, as the adhesive polyolefin, a polypropylene-based resin polymerized by using propylene as a raw material, such as homopolypropylene (propylene homopolymer), a copolymer of propylene and ethylene, and a copolymer of propylene and butene, is preferable; particularly, a propylene-1-butene copolymer, that is, a polyolefin resin having a methyl group and an ethyl group on a side chain is preferable.

Polyimine Compound

In the present embodiment, as the polyimine compound, for example, a compound represented by the following formula (1) is preferable.

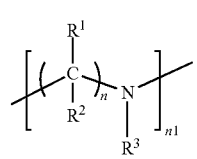

(1)

[In the formula, $R^1$, $R^2$, and $R^3$ each may be the same or different, and represent a non-reactive atom or an organic group, and $R^1$ and $R^2$ may be bonded to each other to form a ring; n is a natural number, and $n^1$ represents an integer of 20 to 2,000.]

$R^1$, $R^2$, and $R^3$ in the formula each may be the same or different, and are preferably a hydrogen atom, an alkyl group, an alkenyl group, an alkynyl group, a cycloalkyl group, an aryl group, a heterocycic group or an alkoxy group.

As the alkyl group in $R^1$, $R^2$, and $R^3$, an alkyl group having 1 to 10 carbon atoms, including a methyl group, an ethyl group, a propyl group, a butyl group, a pentyl group, an isopropyl group, an isobutyl group, and the like is preferable, an alkyl group having 1 to 8 carbon atoms is more preferable, an alkyl group having 1 to 5 carbon atoms is further preferable, and an alkyl group having 1 to 3 carbon atoms is particularly preferable.

As the above-mentioned alkenyl group, an alkenyl group having 2 to 10 carbon atoms is preferable, an alkenyl group having 2 to 8 carbon atoms is more preferable, an alkenyl group having 2 to 5 carbon atoms is further preferable, and an alkenyl group having 2 to 4 carbon atoms is particularly preferable.

As the above-mentioned alkynyl group, an alkynyl group having 2 to 18 carbon atoms, such as an ethynyl group, a 1-propynyl group, and a 1-heptynyl group is preferable, an alkynyl group having 2 to 10 carbon atoms is more preferable, an alkynyl group having 2 to 6 carbon atoms is further preferable, and an alkynyl group having 2 to 4 carbon atoms is particularly preferable.

As the above-mentioned cycloalkyl group, a cycloalkyl group having 3 to 10 carbon atoms, such as a cyclopropyl group, a cyclobutyl group, a cyclopentyl group, a cyclohexyl group, and a cyclooctyl group is preferable, a cycloalkyl group having 3 to 6 carbon atoms is more preferable, and a cycloalkyl group having 5 to 6 carbon atoms is particularly preferable.

As the above-mentioned aryl group, an aryl group having 6 to 10 carbon atoms, such as a phenyl group, a tolyl group, and a naphthyl group is preferable.

Examples of the above-mentioned heterocyclic group include heterocycles containing an oxygen atom as a hetero atom, representatives of which are fused rings such as 5-membered rings including a furan ring, an oxazole ring, an isooxazole ring, and a tetrahydrofuran ring; 6-membered rings including a pyran ring; a benzofuran ring, an isobenzofuran ring, a dibenzofuran ring, a xanthone ring, a xanthene ring, a chroman ring, an isochroman ring, and a chromene ring; heterocycles containing a sulfur atom as a hetero atom, representatives of which are a thiophene ring, a thiazole ring, an isothiazole ring, a thiadiazole ring, a benzothiophene ring, and the like; heterocycles containing a nitrogen atom as a hetero atom, representatives of which are fused rings such as 5-membered rings including a pyrrole ring, a pyrazole ring, an imidazole ring, a triazole ring, and a pyrrolidine ring; 6-membered rings including a pyridine ring, a pyridazine ring, a pyrimidine ring, a pyrazine ring, a piperidine ring, and a morpholine ring; an indole ring, an indolene ring, an isoindole ring, an indazole ring, an indoline ring, an isoindoline ring, a quinoline ring, an isoquinoline ring, a quinolinequinoline ring, a quinoxaline ring, a quinazoline ring, phthalazine ring, a purine ring, a carbazole ring, an acridine ring, a naphthoquinoline ring, a phenanthridine ring, a phenanthroline ring, a naphthyridine ring, a benzoquinoline ring, a phenoxazine ring, a phthalocyanine ring, and an anthracyanine ring; and the like.

Examples of the above-mentioned alkoxy group include alkoxy groups having 1 to 10 carbon atoms, such as a methoxy group, an ethoxy group, a propoxy group, and an isopropoxy group, and preferably alkoxy groups having 1 to 6 carbon atoms.

A suitable specific example of the polyimine compound includes polypropyleneimine.

It is preferable that the polyimine compound has a molecular weight of 1,000 or more, but from the viewpoint of reactivity with olefin after activation treatment and the like, it is preferable that the polyimine compound has a higher molecular weight.

Specifically, the molecular weight is preferably 1,000 to 200,000, more preferably 3,000 to 200,000, and particularly preferably 15,000 to 200,000.

Examples of the radical generator used upon graft treatment include organic peroxides and organic peresters. Used are benzoyl peroxide, dichlorobenzoyl peroxide, dicumyl peroxide, di-tert-butyl peroxide, 2,5-dimethyl-2,5-di(peroxide benzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenyl acetate, tert-butyl perisobutyrate, tert-butyl per-sec-octoate, tert-butyl perpivalate, cumyl perpivalate, and tert-butyl perdiethylacetate, and other azo compounds, for example, azobisisobutyronitrile and dimethyl azoisobutyrate. Among them, dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane, and 1,4-bis(tert-butylperoxyisopropyl)benzene are preferable.

Inter alia, as the radical generator, organic peroxide is preferable. As the organic peroxide, an organic peroxide having a half-life decomposition temperature of 100° C. or higher is suitable. Specifically, as the organic peroxide, at least one selected from the group consisting of dicumyl peroxide, benzoyl peroxide, di-t-butyl peroxide, 2,5-dimethyl-di-(t-butylperoxy)hexane, 2,5-dimethyl-2,5-(t-butylperoxy)hexyne-3, lauroyl peroxide, and t-butyl peroxybenzoate is preferable.

The content of the radical generator is usually 0.001 to 1 part by mass, based on 100 parts by mass of polyolefin.

The above-mentioned imine-modified olefin can be produced by uniformly mixing and treating polyolefin, the polyimine compound, and the radical generator. Specifically, examples of the mixing include a melt kneading method using an extruder, a Banbury mixer, a kneader or the like, a solution method of dissolving the above components in an appropriate solvent, a slurry method of suspending the above components in an appropriate solvent, a so-called vapor phase graft method, and the like. The above-mentioned treatment temperature is appropriately selected in consideration of deterioration of polyolefin, decomposition of the polyimine compound, and the decomposition temperature of the radical generator to be used. For example, in the case of the above-mentioned melt kneading method, the mixing is usually performed at a temperature of 60 to 350° C. The above-mentioned treatment temperature is preferably 190 to 350° C., and more preferably 200 to 300° C.

Modified Polyolefin Having Carbodiimide Group

It is preferable that the modified polyolefin having a carbodiimide group is obtained by reacting polyolefin having a group reactive with a carbodiimide group and a carbodiimide group-containing compound in the presence of unmodified polyolefin. Examples of the method of the reaction include a method of melt kneading the above components at a temperature of 230° C. or higher.

Examples of the polyolefin include homopolymers or copolymers of ethylene, propylene, 1-butene, 4-methyl-1-pentene, 3-methyl-1-butene, 1-hexene, 1-octene, tetracyclododecene, and norbornene.

Examples of the compound having a group reactive with a carbodiimide group include unsaturated carboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid, and bicyclo[2,2,1]hept-2-ene-5,6-dicarboxylic acid, acid anhydrides thereof, and derivatives thereof (for example, acid halide, amide, imide, ester and the like). Among them, maleic anhydride, (meth)acrylic acid, itaconic anhydride, citraconic anhydride, tetrahydrophthalic anhydride, bicyclo[2,2,1]hept-2-ene-5,6-dicarboxylic anhydride, hydroxyethyl (meth)acrylate, glycidyl methacrylate, and aminopropyl methacrylate are preferable.

As a method of introducing the compound having a group reactive with a carbodiimide group into polyolefin, the well-known methods can be adopted, and examples thereof include a method of graft-copolymerizing the compound having a group reactive with a carbodiimide group on a polyolefin main chain, a method of radical-copolymerizing olefin and the compound having a group reactive with a carbodiimide group, and the like.

As the polyolefin having a group reactive with a carbodiimide group, a maleic anhydride graft copolymer of crystalline polyolefin, such as polyethylene, polypropylene, polybutene-1, poly-4-methylpentene-1 or an α-olefin copolymer thereof is preferable, and a maleic anhydride graft copolymer of polyethylene is more preferable. Particularly, a maleic anhydride graft copolymer of polyethylene having a density of 0.915 g/cm³ or more is preferable.

As the carbodiimide group-containing compound, polycarbodiimide having a repetition unit represented by the following formula (2) is preferable.

$$-N=C=N-R^4- \qquad (2)$$

(In the formula, $R^4$ represents a divalent organic group having 2 to 40 carbon atoms.)

The polycarbodiimide can be produced by subjecting, in the presence of a condensation catalyst, organic diisocyanate such as aliphatic diisocyanate, aromatic diisocyanate, or alicyclic diisocyanate to a decarboxylation condensation reaction without a solvent or in an inert solvent. For example, diisocyanates such as hexamethylene diisocyanate, 4,4-diphenylmethane diisocyanate, 1,4-phenylene diisocyanate, 2,4-tolylene diisocyanate, xylylene diisocyanate, cyclohexane-1,4-diisocyanate, dicyclohexylmethane-4,4'-diisocyanate, and isophorone diisocyanate can be used.

Examples of the unmodified polyolefin include low density polyethylene, high density polyethylene, linear low density polyethylene, polypropylene, an ethylene-propylene copolymer, an ethylene-α-olefin copolymer, an ethylene-butene copolymer, an ethylene-hexene copolymer, an ethylene-octene copolymer, polybutene-1, poly-4-methyl-1-pentene, poly-3-methyl-1-butene, cyclic polyolefin such as an ethylene-tetracyclododecene copolymer, and the like.

Unmodified Polyolefin

In the present embodiment, the adhesive agent composition may contain unmodified polyolefin. Examples of the unmodified polyolefin include the unmodified polyolefins described in description of the above-mentioned modified polyolefin having a carbodiimide group, and inter alia, polypropylene is preferable.

In the present embodiment, the unmodified polyolefin has a melt flow rate measured under conditions of a temperature of 190° C. or 230° C. and a load of 2.16 kg in accordance with ASTM D1238 of preferably 2 g/10 min or more and 25 g/10 min or less, more preferably 2.5 g/10 min or more and 20 g/10 min or less, and further preferably 2.8 g/10 min or more and 18 g/10 min or less.

In the present embodiment, when the adhesive agent composition contains the unmodified polyolefin, the amount of the unmodified polyolefin is preferably 1 part by mass or more and 40 parts by mass or less, and more preferably 5 parts by mass or more and 35 parts by mass or less, based on 100 parts by mass of the total amount of the adhesive agent composition.

Olefin-Based Elastomer

In the present embodiment, the adhesive agent composition may contain an olefin-based elastomer. Examples of the olefin-based elastomer include a block copolymer having a hard segment including polystyrene or the like and a soft segment including polyethylene, polybutadiene, polyisoprene or the like. Examples of the olefin-based polymer usable in the olefin-based elastomer include copolymers of aromatic olefin-aliphatic olefin such as a styrene-butadiene copolymer, a styrene-isoprene copolymer, and a styrene-ethylene copolymer.

In the present embodiment, when the adhesive agent composition contains the olefin-based elastomer, the amount of the olefin-based elastomer is preferably 1 part by mass or more and 40 parts by mass or less, and more preferably 5 parts by mass or more and 35 parts by mass or less, based on 100 parts by mass of the total amount of the adhesive agent composition.

<<Laminate for Battery Outer Package>>

Examples of the laminate 20 for a battery outer package to which the electrode lead wire member 10 of the present embodiment is fused include a laminated film in which the sealant layer 22 is laminated on one surface of the metal foil layer 21 and the film substrate layer 23 is laminated on the other surface of the metal foil layer 21, as shown in FIG. 1, and the like. The laminate 20 for a battery outer package may include another layer to be laminated.

The laminate 20 for a battery outer package is molded into a drawn container.

Examples of the metal foil layer 21 include an aluminum foil, a stainless foil, a copper foil, an iron foil, and the like. The metal foil layer 21 may be subjected to surface treatment such as chemical conversion treatment.

As the resin forming the sealant layer 22 of the laminate 20 for a battery outer package, a resin which can be fused with the sealing film 1 is selected. Examples of such a resin include a polypropylene-based resin, and a homopolymer of polypropylene, a copolymer of propylene and ethylene, and the like can be used for the polypropylene-based resin.

When the sealant layer 22 is a polyethylene-based resin, low density polyethylene, linear low density polyethylene, and the like can be used.

The resin constituting the film substrate layer 23 is not particularly limited, but polyamide, polyethylene terephthalate (PET), a phenol resin, polypropylene, and the like, which have large strength, are suitably used.

EXAMPLES

The present invention will be described in further detail below by way of examples, but the present invention is not limited by these examples.

<Production of Modified Polyolefin (A)-3 Having Carbodiimide Group>

To 25 parts by weight of maleic acid-modified polypropylene were added 25 parts by weight of polypropylene manufactured by Mitsui Chemicals, Inc. and 3 parts by weight of polycarbodiimide (manufactured by Nisshinbo Holdings Inc., product name CARBODILITE HMV-8CA), the materials were melted and kneaded with a 65 mm φ single screw extruder (manufactured by Modern Machinery Ltd.) at 250° C. (retention time=2 minutes) to obtain a modified polyolefin (A)-3 having a carbodiimide group.

<Production of Adhesive Agent Composition>

An adhesive polyolefin resin, an olefin-based elastomer, and unmodified polyolefin shown in the following Table 1 were melted and kneaded at 280° C. for 2 minutes to produce adhesive agent compositions 1 to 6.

TABLE 1

|  | Adhesive polyolefin resin | Olefin-based elastomer | Unmodified polyolefin |
| --- | --- | --- | --- |
| Adhesive agent composition 1 | (A)-1 [100] | — | — |
| Adhesive agent composition 2 | (A)-2 [70] | (A1)-1 [30] | — |
| Adhesive agent composition 3 | (A)-1 [70] | — | (B) [30] |
| Adhesive agent composition 4 | (A)-1 [70] | (A1)-1 [15] | (B) [15] |
| Adhesive agent composition 5 | (A)-3 [100] | — | — |
| Adhesive agent composition 6 | (A)-4 [100] | — | — |

In the above-mentioned Table 1, respective symbols mean the following materials.

A numerical value in the parenthesis is an addition amount (parts by mass).

(A)-1: Imine-modified polyolefin (manufactured by Mitsui Chemicals, Inc., ADMER IP, melt flow rate: 3).

(A)-2: Imine-modified polyolefin (manufactured by Mitsui Chemicals, Inc., ADMER IP, melt flow rate: 15).

(A)-3: Modified polyolefin having a carbodiimide group.

(A)-4: Acid-modified polyolefin (manufactured by Mitsui Chemicals, Inc., product name: ADMER).

(A1)-1: Olefin-based elastomer resin (MP: 120° C.).

(B): Polypropylene resin manufactured by SunAllomer Ltd. (melt flow rate: 3)

As an adhesive laminate A, a laminate was produced in which the adhesive agent composition 1, a PET film as a substrate layer, and the adhesive agent composition 1 are laminated in that order.

<Production of Electrode Lead Wire Member>

<<Step of Surface-Treating Electrode Lead Wire Member>>

As a derivation sealing portion of an electrode lead wire member for a lithium battery, an aluminum piece obtained by cutting an aluminum plate having a thickness of 200 μm into the dimension of width 50 mm×length 60 mm was used. An aqueous solution obtained by dissolving 1% by mass of an amorphous polymer having a skeleton of polyvinyl alcohol containing a hydroxy group (manufactured by Nippon Synthetic Chemical Industry Co., Ltd., product name: G Polymer Resin) and 1% by mass of chromium (III) fluoride was applied onto both surfaces of the defatted and washed aluminum piece with a dispenser so that the thickness after drying under heat was 1 μm, to laminate a surface-treated layer (thin film coating layer) (Treatment 1). Further, the laminate was dried under heat in an oven at 200° C., and the resin was baked and simultaneously crosslinked to obtain an electrode lead wire member.

<<Step of Producing Sealing Film>>

Each of the adhesive agent compositions 1 to 6 was prepared into a 100 μm sealing film by melt casting.

<<Step of Sealing Sealing Film and Laminate for Battery Outer Package on Surface-Treated Electrode>>

A sealing film having a width 50 mm×a length 20 mm was joined on the surface-treated layer (thin film coating layer) of the derivation sealing portion of the electrode lead wire member by heat sealing. Further, a laminate for a battery outer package having a width 50 mm×a length 60 mm and having a thickness of 145 μm, which included an aluminum foil (thickness 40 μm)/polypropylene film (thickness 80 μm), was heat-sealed on the sealing film, to prepare a part of a battery accommodating container.

<<Method of Measuring Adhesive Strength Between Electrode Lead Wire Member and Sealing Film>>

Method of measuring adhesive strength between derivation sealing portion of electrode lead wire member and sealing film: the strength was measured by the measuring method defined in JIS C6471 "Test Methods of Copper-Clad Laminates for Flexible Printed Wiring Boards".

In the measuring method, the electrode lead wire member was fixed, and the laminate for a battery outer package was peeled under the following conditions.

Peeling Conditions

180° peeling

Peeling rate: 300 mm/min

For the adhesive strength, the values obtained by the measurement were assessed based on the following criteria, and the results thereof are described in Table 2.

Adhesive Strength

50 N/inch or more: ⊙
45 N/inch or more and less than 50 N/inch: ○
40 N/inch or more and less than 45 N/inch: Δ
35 N/inch or more and less than 40 N/inch: x <<Test of Resistance to Electrolytic Solution>>

As a test of resistance to an electrolytic solution, an electrolytic solution strength retention rate was measured by the following method.

Method of measuring electrolytic solution strength retention rate: the laminate for a battery outer package was prepared into a four-sided bag of 50×50 mm (heat sealing width: 5 mm), 0.5% by mass of pure water was added to a PC/DEC electrolytic solution with 1 mol/liter $LiPF_6$ added thereto, and 2 cc of the resulting solution was weighed, filled therein, and packaged. A sample for measurement was placed into this four-sided bag, the bag was stored in an oven at 60° C. for 100 hours, and thereafter, the interlayer adhesive strength (k2) between the electrode lead wire member and the sealing film was measured.

Herein, a ratio between the interlayer adhesive strength (k1) between the electrode lead wire member and the sealing film before exposure to the electrolytic solution, which had been measured in advance, and the interlayer adhesive strength (k2) after exposure to the electrolytic solution was defined as electrolytic solution strength retention rate $K=(k2/k1)\times100(\%)$.

The values obtained by the measurement were assessed based on the following criteria, and the results thereof are described in Table 2.

Electrolytic Solution Strength Retention Rate K

K=90% or more: ⊙
K=85% or more and less than 90%: ○
K=80% or more and less than 85%: Δ
K=75% or more and less than 80%: x

TABLE 2

|  | Electrode material | Adhesive layer | Surface-treated layer | Adhesive strength | Test of resistance to electrolytic solution |
|---|---|---|---|---|---|
| Example 1-1 | Aluminum plate | Adhesive agent composition 1 | Treatment 1 | ⊙ | ○ |
| Example 1-2 | Aluminum plate | Adhesive agent composition 2 | Treatment 1 | ○ | ⊙ |
| Example 1-3 | Aluminum plate | Adhesive agent composition 3 | Treatment 1 | ○ | ○ |
| Example 1-4 | Aluminum plate | Adhesive agent composition 4 | Treatment 1 | ○ | Δ |
| Example 1-5 | Aluminum plate | Adhesive agent composition 5 | Treatment 1 | ○ | ○ |
| Example 1-6 | Aluminum plate | Adhesive laminate A | Treatment 1 | ⊙ | ○ |
| Example 2-1 | Ni plated copper plate | Adhesive agent composition 1 | Treatment 1 | ⊙ | ○ |
| Example 2-2 | Ni plated copper plate | Adhesive agent composition 2 | Treatment 1 | ○ | ⊙ |
| Example 2-3 | Ni plated copper plate | Adhesive agent composition 3 | Treatment 1 | ○ | ○ |
| Example 2-4 | Ni plated copper plate | Adhesive agent composition 4 | Treatment 1 | ○ | Δ |
| Example 2-5 | Ni plated copper plate | Adhesive agent composition 5 | Treatment 1 | ○ | ○ |
| Example 2-6 | Ni plated copper plate | Adhesive laminate A | Treatment 1 | ⊙ | ○ |
| Comparative Example 1 | Aluminum plate | Adhesive agent composition 6 | Treatment 1 | Δ | X |
| Comparative Example 2 | Ni plated copper plate | Adhesive agent composition 6 | Treatment 1 | Δ | X |

As shown in the above-mentioned results, in Examples 1-1 to 1-6 to which the present invention was applied, an adhesive force to an aluminum plate was high and resistance to an electrolytic solution was also high, as compared with Comparative Example 1.

Furthermore, in Examples 2-1 to 2-6 to which the present invention was applied, an adhesive force to a Ni plated copper plate was high and resistance to an electrolytic solution was also high, as compared with Comparative Example 2.

DESCRIPTION OF THE REFERENCE NUMERALS

1: Sealing film
2: Surface-treated layer
10: Electrode lead wire member
11: Derivation portion
17: Lithium ion battery
19: Side edge
20: Laminate for battery outer package
20a: Battery
21: Metal foil layer
22: Sealant layer
23: Film substrate layer

What is claimed is:

1. An electrode lead wire member comprising:
    a derivation portion extending in one direction;
    a surface-treated layer formed, at said derivation portion, on a surface of said derivation portion; and
    a sealing film provided in contact with said surface-treated layer,
    wherein
    said sealing film has an adhesive resin layer in contact with said surface-treated layer,
    said adhesive resin layer contains imine-modified polyolefin, and
    said surface-treated layer has an acidic group.

2. The electrode lead wire member according to claim 1, wherein said sealing film only includes said adhesive resin layer.

3. The electrode lead wire member according to claim 1, wherein in said sealing film, said adhesive resin layer, a substrate layer, and a second adhesive resin layer are laminated in that order.

4. The electrode lead wire member according to claim 3, wherein a resin constituting said substrate layer is one or more selected from the group consisting of a fluorine resin, polyether ether ketone, a polyphenylene sulfide resin, polyphenylene ether, a syndiotactic polystyrene resin, polyethylene naphthalate, polyethylene terephthalate, a polyimide resin, a phenol resin, an epoxy resin, an acrylic resin, polyketone, a cyclic olefin resin, polymethylpentene, polypropylene, and polyethylene.

5. The electrode lead wire member according to claim 1, comprising one pair of sealing films holding said derivation portion, wherein
    in said one pair of said sealing films, adhesive resin layers face and come in contact with each other, and simultaneously come in contact with a whole circumference in a circumferential direction of said derivation portion to cover said derivation portion.

6. A battery comprising the electrode lead wire member with the sealing film according to claim 1.

* * * * *